United States Patent [19]

Razeto et al.

[11] Patent Number: 4,748,904

[45] Date of Patent: Jun. 7, 1988

[54] CHLORINE GENERATOR FOR PRESERVATION OF FRUITS AND VEGETABLES

[76] Inventors: Andres V. R. Razeto, Ave. Tobalaba 1719, Santiago; Victor O. B. Saavedra, Etchevers 758-Depto. 6, Via Del Mar; Maria E. P. C. Concha, Eyzaguirre 163, San Bernardo, all of Chile

[21] Appl. No.: 880,758

[22] Filed: Jul. 1, 1986

[51] Int. Cl.$^4$ ................................................. A23B 7/00
[52] U.S. Cl. ............................................. 99/467; 53/432; 99/485; 206/0.6; 206/205; 422/29; 426/124; 426/316; 426/418
[58] Field of Search .................. 99/467, 473, 481; 206/205, 221, 222, 219; 53/432–434; 422/236, 305, 29, 32, 40; 426/124, 323, 316, 319, 418, 419

[56] References Cited

U.S. PATENT DOCUMENTS

| | | | |
|---|---|---|---|
| 2,071,625 | 2/1937 | Haas et al. | 99/172 |
| 4,094,119 | 6/1978 | Sullivan | 53/4 |
| 4,411,918 | 10/1983 | Cimino et al. | 426/124 |
| 4,528,228 | 7/1985 | Clevenger | 428/74 |

Primary Examiner—Timothy F. Simone
Attorney, Agent, or Firm—Seidel, Gonda, Goldhammer & Abbott

[57] ABSTRACT

A chlorine generator for preserving fruits and vegetables includes a first layer of paper, a second layer of paper and a third layer of paper. The first and second layers of paper are made of a laja type paper having a weight of about 30 to 70 gr/m$^2$. One surface of the first layer is coated with a plastic permeable film having a weight of about 5 to 25 gr/m$^2$. Both surfaces of the second layer are coated with a plastic permeable film having a weight of about 5 to 25 gr/m$^2$. The third layer is made of a kraft type paper weight about 40 to 80 gr/m$^2$. The three layers are joined together by a thermal seal. Pockets are defined by the layers and the seals. Calcium hypochlorite is placed in the pockets. The kraft paper layer can be impregnated with a mixture including about 1 part calcium hypochlorite anhydrous, about 4 parts calcium sulphate, about 8 parts toluene and about 2 parts acrylic lacquer.

17 Claims, 1 Drawing Sheet

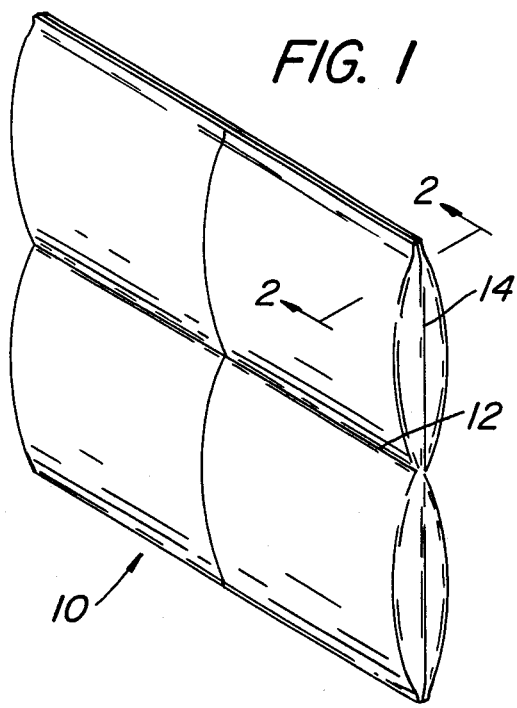
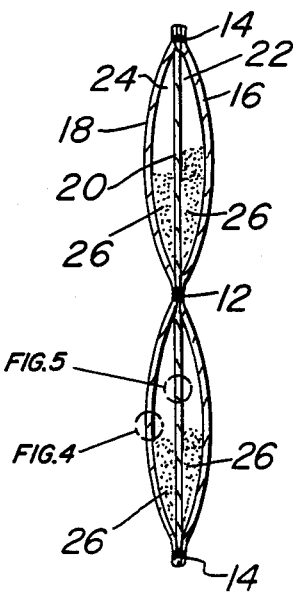
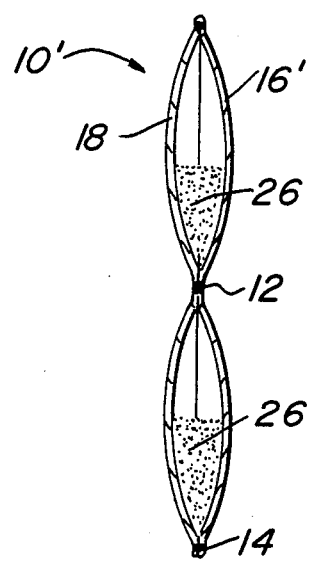
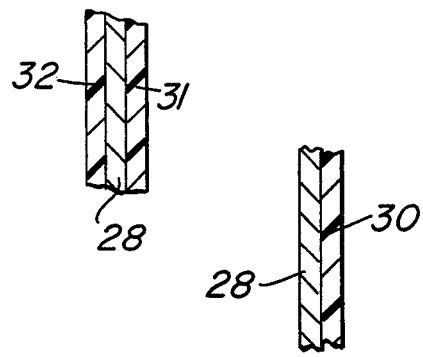
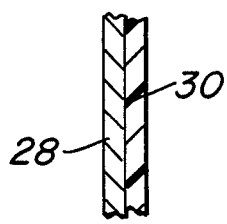

CHLORINE GENERATOR FOR PRESERVATION OF FRUITS AND VEGETABLES

FIELD OF THE INVENTION

This invention is directed to a chlorine generator for the preservation of fruits and vegetables.

BACKGROUND OF THE INVENTION

The need for preservative devices used during transportion of fruits and vegetables is becoming more important. This need is becoming greater as the fruits and produce consumed by city dwellers are being shipped from greater and greater distances.

It is known to use sulfur dioxide generators when shipping grapes packaged in containers. The problem with this method is that the sulfur dioxide generator has a strong decolorizing affect on the grapes. The decolorizing of the grapes makes it difficult to market grapes to the consuming public.

It is also known to spray aqueous solutions of hypochlorites into the containers utilized for transport and handling of asparagus. This technique is quite complex due to the poor control of the aqueous concentrations of hypochlorite. When the concentration of the hypochlorite is too high, the asparagus is attacked and spoiled. Furthermore, high concentrations of aqueous hypochlorite pose a corrosion problem in metal containers.

U.S. Pat. No. 2,071,625 (Haas et al) is directed to a method of preserving packaged bakery products. Haas et al is directed to bakery products susceptible to the growth of microorganisms. Haas et al disclose that the bakery product is enveloped in a wrapping material which is treated or impregnated with a harmless compound that liberates a germacidal gas. The germacidal gas is free chlorine. The material which generates the chlorine is preferably chlorazene or chloramine-T and dichloramine or dichloramine-T. This reference also discloses that hypochlorites of sodium, potassium and calcium are suitable as a source of chlorine.

U.S. Pat. No. 4,094,119 (Sullivan) discloses a method of making a product for dispensing a volatile substance. The product includes a polypropylene backing layer, a non-woven material forming a reservoir layer, and a microporous polypropylene layer covering the reservoir layer. All three of the layers are joined around the peripheral edge portions. The reservoir layer stores the volatile substance.

U.S. Pat. No. 4,411,918 (Cimino et al) discloses an apparatus for preserving food by generating a preservative gas. The gas generating device comprises a basin-like main container and an auxiliary container located at the interior of the main container. The main container carries a solid chemical reagent. The auxiliary container carries a liquid chemical substance. The gas generating device is placed within a produce storage or transport receptacle. The preservative gas is generated when an operator pierces the main auxiliary containers, which allows the liquid chemical substance to react with the solid chemical substance. The preservative gases disclosed in this reference include carbon dioxide and sulfur dioxide.

U.S. Pat. No. 4,528,228 (Clevenger) discloses at atmosphere control-cushioning pad for fruits. The pad comprises an upper and lower sheet, which are joined together at their peripheral edge portions, and a cushioning material is enclosed between the upper and lower sheets. The cushioning material may include a chemical composition. For example, the chemical composition can be calcium hydroxide which absorbs carbon dioxide, or potassium permanganate which oxidizes ethylene. Calcium chloride is also suggested because it absorbs water and assists in the cushioning function of the pad by expanding.

SUMMARY OF THE INVENTION

The present invention is directed to a chlorine generator for preserving fruits and vegetables. The generator includes a first layer consisting of a paper having a weight of about 30 to 70 $gr/m^2$ and one surface of said first layer being coated with a permeable film having a weight of about 5 to 25 $gr/m^2$. A second layer consists of paper having a weight of about 30 to 70 $gr/m^2$ and both surfaces of the second layer being coated with a permeable film having a weight of about 5 to 25 $gr/m^2$. A third layer consists of a paper having a weight of about 40 to 80 $gr/m^2$. The layers are joined together by a bond such that at least one pocket is formed between the first and second layers and between the second and third layers. A hypochlorite material is disposed in said pocket.

The first and second layers are preferably made of a laja type paper. The permeable film is preferably polyethylene. The third layer is preferably a kraft type paper. The bond is preferably a thermal seal.

The preferred embodiment of this invention has been found to be particularly effective in the control of Botrytis Cinerea in grapes. The grapes were stored in conventional boxes and maintained at 0° centigrade for 60 or more days. The grapes, so stored, showed no side effect such as decoloration, browning, dehydration or others.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an isometric view of a preferred embodiment of the invention.

FIG. 2 is a sectional view of the preferred embodiment of FIG. 1 taken along sectional lines 2—2.

FIG. 3 is a sectional view of another embodiment of the invention.

FIGS. 4 and 5 are an enlarged cross-sectional view of a part of the invention.

DETAILED DESCRIPTION OF THE INVENTION

Referring to the drawings wherein like numerals indicate like elements, there is shown in FIG. 1 a first embodiment of the herein described chlorine generator 10.

The generator 10 comprises first and second layers 16 and 20 which are made of a laja type paper 28 having a weight of between about 30 to 70 $gr/m^2$, preferably having a weight of about 59 $gr/m^2$. Laja type paper is a paper made from the fibers of the Sisal (Agave sisalana) plant. One surface of the first layer 16 is coated with a plastic permeable film 30 having a weight of between about 5 to 25 $gr/m^2$ preferably 11 $gr/m^2$. See FIG. 4. One surface of the second layer 20 is coated with a plastic permeable film 31 having a weight of between about 5 to 25 $g/m^2$, perferbly 11 $gr/m^2$. The other surface of second layer 20 is coated with a plastic permeable film 32 having a weight of between about 5 to 25 gr/m², preferably 15 gr/m². See FIG. 5. Of course, any paper 28 or films 30, 31, 32 which are permeable to both moisture and active chlorine gas are suitable materials for the first and second layers. The films 30, 31 and 32 can be polyethylene or PVC, but preferably are polyethylene.

The third layer 18 is a kraft type paper. The third layer is also permeable to both moisture and active chlorine gas. The kraft type paper has a weight of between about 40 to 80 gr/m², and preferably about 60 gr/m².

The first and third layers sandwich the second layer 20. See FIG. 2. The three layers are preferably joined together around their peripheral edges by a thermal seal 14. Such seals are well known in the art. Alternatively, the thermal seal can be replaced with gluing or any other suitable means for joining or bonding the three layers together and which will prevent any leakage of material from between layers.

On the interior of the peripheral seal 14 there are provided a plurality of thermal seals 12. The thermal seals 12 are identical to those described with relation to the thermal seal 14. The thermal seals 12 join the layers on the inner regions of the generator 10.

The combination of thermal seals 12 and 14 and the layers 16, 18 and 20 define pockets 22 and 24. See FIGS. 1 and 2. Pocket 22 is between first layer 16 and second layer 20. Pocket 24 is between second layer 20 and third layer 18.

A hypochlorite material 26 is placed in each pocket. Preferably, about 1.2 grams of calcium hypochloride is placed in each pocket. The hypochlorite material is either in granulated or powder form. The hypochlorite material is a commercial grade material which is not absolutely pure. The hypochlorite material may contain sodium chloride. The preferred hypochlorite material is calcium hypochlorite. Of course, it is apparent those skilled in the art that any hypochlorite material which is capable of releasing chlorine upon reaction with moisture will be suitable for this purpose.

The hypochlorite material releases active chlorine gas upon its reaction with moisture. The moisture from the fruits and vegetables diffuses through first and third layers 16 and 18. The moisture and hypochlorite react to liberate active chlorine. Part of the mechanism of the reaction is an acid hydrolysis of the hypochlorite. Active chlorine gas, in turn, diffuses back out from pockets 22 and 24 diffusing through first and third layers 16 and 18. The active chlorine reacts with ethylene. Ethylene is the principle catalyst in the ripening process of fruits and vegetables. Accordingly, the active chlorine retards the ripening process of the fruits and vegetables.

The diffusion of chlorine through the first layer 16 produces a relatively slow release of chlorine from the generator. The diffusion of chlorine through the third layer 18 produces a relatively fast release of chlorine from the generator. The slow and fast releases are apparently due to the rate limiting diffusion step.

An alternate third layer 18 is impregnated with a reagent mixture. The reagent mixture allows for a faster release of chlorine gas. The mixture comprises about one (1) part calcium hypochlorite anhydrous, about 4 parts calcium sulphate, about 8 parts toluene and about 2 parts acrylic lacquers (esters of acrlyic acid). Of course, it is understood that all components of the reagent mixture are commercial grade and not necessarily pure. The alternate third layer 18 could be used as a chlorine generator without the first and second layers.

A second embodiment of this invention 10' is shown in FIG. 3. The generator 10' consists of a first and third layers 16 and 18 which are identical to the previously described embodiment. Pockets are formed in the joined layers by thermal seals 12 and 14 as described above. Hypochlorite material 26 is placed within the pocket.

The second embodiment 10' can also include a third layer 18 which is impregnated with the reagent mixture.

The present invention is packed with the fruits and vegetables. The invention can be placed in the fruit or vegetable container before or after the fruits or vegetables are placed in the container.

The present invention may be embodied in other specific forms without departing from the spirit or essential attributes thereof and, accordingly, reference should be made to the appended claims, rather than to the foregoing specification, as indicating the scope of the invention.

We claim:

1. A chlorine generator for preserving fruits and vegetables comprising:
   a first layer consisting of a paper having two surfaces and a weight of about 30 to 70 gr/m² and a permeable film having a weight of about 5 to 25 gr/m² and coating one said surface of said paper of said first layer;
   a second layer consisting of a paper having two surfaces and a weight of about 30 to 70 gr/m² and a permeable film having a weight of about 5 to 25 gr/m² and coating both surfaces of said paper of the second layer;
   a third layer consisting of a paper having a weight of about 40 to 80 gr/m²;
   a bond joining together said layers such that at least one pocket is formed between the first and third layers and between the second and third layers; and
   a hypochlorite material being disposed in said pocket, said hypochlorite material releasing active chlorine gas upon reaction with moisture from said fruit and vegetables.

2. The chlorine generator according to claim 1 wherein said hyopchlorite material is calcium hypochlorite.

3. The chlorine generator according to claim 1 wherein said paper of said first and second layers is a laja type paper.

4. The chlorine generator according to claim 1 wherein said paper of said third layer is a kraft type paper.

5. The chlorine generator according to claim 1 wherein said third layer is impregnated with a reagent mixture which releases active chlorine gas; said mixture comprising about one part calcium hypochlorite anhydrous, about 4 parts calcium sulphate, about 8 parts toluene, and about 2 parts acrylic lacquer.

6. The chlorine generator according to claim 1 wherein said paper of said first layer has a weight of about 59 gr/m² and said film of said first layer has a weight of about 11 gr/m².

7. The chlorine generator according to claim 1 wherein said paper of said second layer has a weight of about 59 gr/m² and said film of said second layer has a weight of about 11 gr/m².

8. The chlorine generator according to claim 1 wherein said paper of said third layer has a weight of about 60 gr/m².

9. The chlorine generator according to claim 1 wherein said film of said first and second layers is a polyethylene film.

10. A chlorine generator for preserving fruits and vegetables comprising:
- a first layer consisting of a paper having two surfaces and a weight of about 30 to 70 gr/m² and a permeable film having a weight of about 5 to 25 gr/m² and coating one said surface of said paper of said first layer;
- a second layer consisting of a paper having a weight of about 40 to 80 gr/m²;
- a bond joining together said layers such that at least one pocket is formed between the first and second layers; and
- a hypochlorite material being disposed in said pocket, said hypochlorite material releasing active chlorine gas upon reaction with moisture from said fruits and vegetables.

11. A chlorine generator according to claim 10 wherein said hypochlorite material is calcium hypochlorite.

12. A chlorine generator according to claim 10 wherein said paper of said first layer is a laja type paper.

13. A chlorine generator according to claim 10 wherein said paper of said second layer is a kraft type paper.

14. A chlorine generator according to claim 10 wherein said second layer is impregnated with a reagent mixture which releases chlorine gas; said mixture comprising about 1 part calcium hypochlorite anhydrous, about 4 parts calcium sulphate, about 8 parts toluene and about 2 parts acrylic lacquer.

15. A chlorine generator for preserving fruits and vegetables comprises:
- a first layer consisting of a laja type paper having two surfaces and a weight of about 30 to 70 gr/m² and a plastic permeable film having a weight of about 5 to 25 gr/m² and coating one said surface of said paper of said first layer;
- a second layer consisting of a laja type paper having two surfaces and a weight of about 30 to 70 gr/m² and a plastic permeable film having a weight of about 5 to 25 gr/m² and coating both surfaces of said paper of said second layer;
- a third layer consisting of a kraft type paper having a weight of about 40 to 80 gr/m², said third layer being impregnated with a reagent mixture which releases chlorine gas, said mixture comprising about 1 part calcium hypochlorite anhydrous, about 4 parts calcium sulphate, about 8 parts toluene and about 2 parts acrylic lacquer;
- a thermal seal joining together said layers such that at least one pocket is formed between the first and second layers and between the second and third layers; and
- a calcium hypochlorite material being disposed in said pockets, said calcium hypochlorite material releasing active chlorine gas upon reaction with moisture from said fruits and vegetables.

16. A chlorine generator for preserving fruits and vegetables comprising:
- a first layer consisting of a laja type paper having two surfaces an a weight of about 30 to 70 gr/m² and a plastic permeable film having a weight of about 5 to 25 gr/m² and coating one said surface of said paper of said first layer;
- a second layer consisting of a kraft type paper having a weight of about 40 to 80 gr/m², said second layer being impregnated with a reagent mixture which releases chlorine gas, said mixture comprising about 1 part calcium hypochlorite anhydrous, about 4 parts calcium sulphate, about 8 parts toluene and about 2 parts acrylic lacquer;
- a thermal seal joining together said layers such that at least one pocket is formed between the first and second layer; and
- a calcium hypochlorite material being disposed in said pocket, said calcium hypochlorite material releasing active chlorine gas upon reaction with moisture from said fruits and vegetables.

17. A chlorine generator for preserving fruits and vegetables comprising:
- a first layer consisting of a paper having two surfaces and a permeable film coating one said surface of said paper of said first layer;
- a second layer consisting of a paper having two surfaces and a permeable film coating both surfaces of said paper of said second layer;
- a third layer consisting of a paper;
- a bond joining together said layers such that at least one pocket is formed between the first and third layers and between the second and third layers; and
- a hypochlorite material being disposed in said pocket, said hypochlorite material releasing active chlorine gas upon reaction with moisture from said fruits and vegetables.

* * * * *